United States Patent
Moriwaki et al.

(10) Patent No.: US 6,463,066 B2
(45) Date of Patent: *Oct. 8, 2002

(54) ATM SWITCH

(75) Inventors: Norihiko Moriwaki, Yokohama; Kenichi Sakamoto; Akihiko Takase, both of Tokyo; Akio Makimoto, Yokohama; Kazumasa Yanagisawa, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/797,696

(22) Filed: Mar. 5, 2001

(65) Prior Publication Data

US 2001/0009551 A1 Jul. 26, 2001

Related U.S. Application Data

(63) Continuation of application No. 09/044,171, filed on Mar. 19, 1998, now Pat. No. 6,249,524.

(30) Foreign Application Priority Data

Mar. 19, 1997 (JP) .............................................. 9-065908

(51) Int. Cl.[7] .................................................. H04J 3/24
(52) U.S. Cl. .................... 370/412; 370/378; 370/395.7; 711/117
(58) Field of Search ................................. 370/379, 380, 370/381, 382, 383, 395, 396, 397, 398, 399, 401, 402, 412, 415, 417, 419, 378, 395.7, 395.71, 395.72; 711/117, 122

(56) References Cited

U.S. PATENT DOCUMENTS

| | | | | |
|---|---|---|---|---|
| 4,041,461 A | * | 8/1977 | Kratz et al. .................. | 364/200 |
| 5,398,235 A | | 3/1995 | Tsuzuki et al. ............. | 370/398 |
| 5,548,588 A | | 8/1996 | Ganmukki et al. ......... | 370/395 |
| 5,790,539 A | | 8/1998 | Chao et al. ................. | 370/398 |
| 5,862,136 A | * | 1/1999 | Irwin ......................... | 370/375 |
| 5,864,542 A | | 1/1999 | Gupta et al. ................ | 370/257 |
| 6,012,108 A | * | 1/2000 | Kang ......................... | 370/395 |
| 6,249,524 B1 | * | 6/2001 | Moriwaki et al. .......... | 370/412 |

* cited by examiner

*Primary Examiner*—Douglas Olms
*Assistant Examiner*—Shick Hom
(74) *Attorney, Agent, or Firm*—Antonelli, Terry, Stout & Kraus, LLP

(57) ABSTRACT

Provided is a high-throughput large-capacity ATM switch in which variation in memory access time and data output delay time generated in the case where a DRAM is used as a cell buffer of the ATM switch is absorbed. To realize this, the ATM switch comprises a first memory using a DRAM for storing cells, a second memory using an SRAM for switching and temporarily storing the cells before transferring the cells to the first memory, and a controller for generating write/read address and timing signals for the first and second memories. The controller generates read address and timing signals for the second memory and write address and timing signals for the first memory taking variation in access time or delay time based on access address of the first memory into account, so that the cells are output on destination output lines after the cells are switched and stored in the second memory and then stored in the first memory.

4 Claims, 13 Drawing Sheets

| t | R/W | Address | ACCESS TYPE |
|---|---|---|---|
| t=0 | W | A000 | Col. |
| t=1 | W | A001 | Col. |
| t=2 | W | A002 | Col. |
| t=3 | W | A003 | Col. |
| t=4 | R | A000 | Col. |
| t=5 | W | A004 | Col. |
| t=6 | W | A005 | Col. |
| t=7 | W | A006 | Col. |
| ⋮ | W | ⋮ | ⋮ |
| ⋮ | R | A002 | Col. |
| ⋮ | W | ⋮ | ⋮ |

| t | R/W | Address | ACCESS TYPE |
|---|---|---|---|
| t=0 | W | A01j | Col. |
| t=1 | W | A110 | Bank |
| t=2 | W | A111 | Col. |
| t=3 | W | A112 | Col. |
| t=4 | R | A101 | Row |
| t=5 | W | A113 | Col. |
| t=6 | W | A114 | Col. |
| t=7 | W | A115 | Col. |
| ⋮ | W | ⋮ | ⋮ |
| ⋮ | R | A102 | Row |
| ⋮ | W | ⋮ | ⋮ |

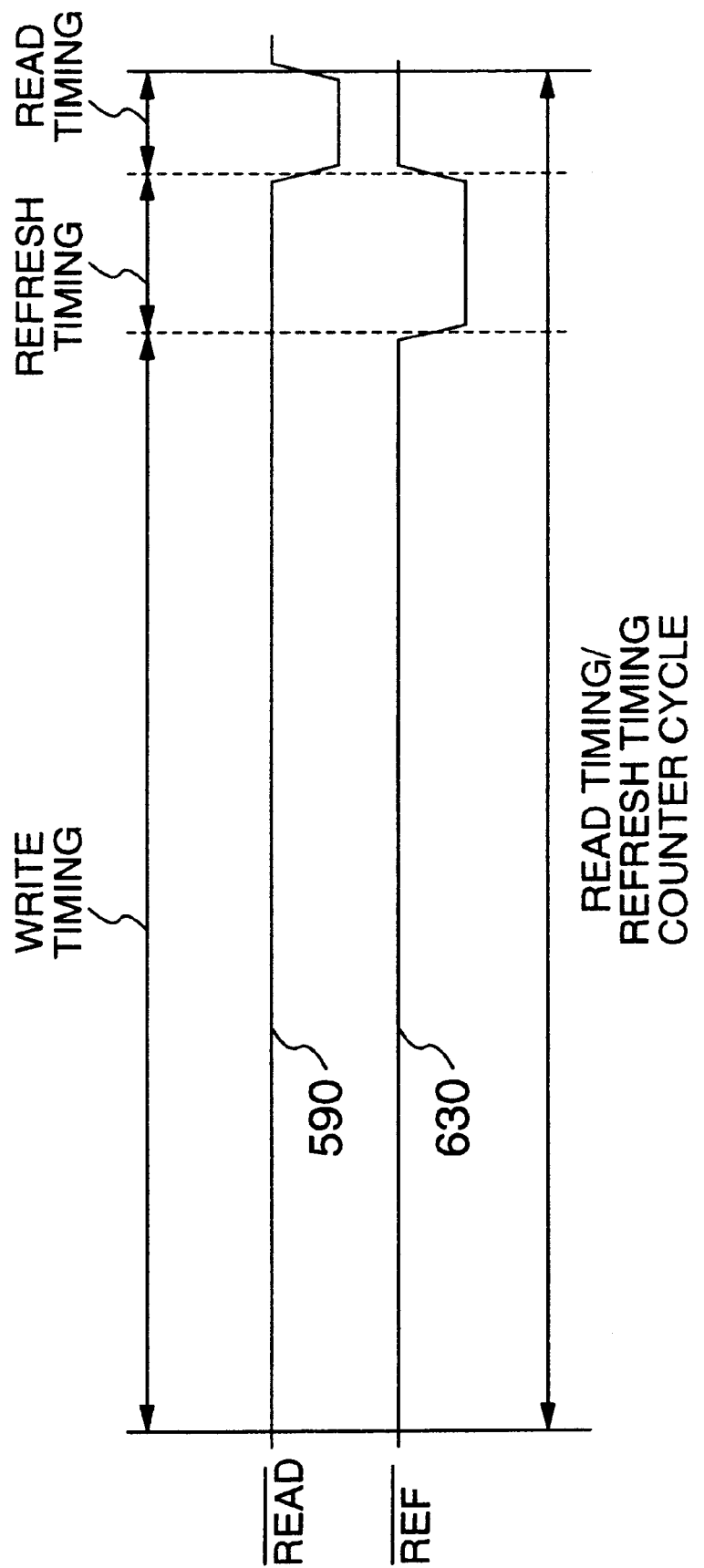

ATM SWITCH

This is a continuation of application Ser. No. 09/044,171, filed Mar. 19, 1998 now U.S. Pat. No. 6,249,524.

BACKGROUND OF THE INVENTION

The present invention relates to a configuration of an ATM switch (ATM being abbreviation of "asynchronous transfer model") for switching ATM signals which are suitable for broadband communication.

Various types of ATM switches have been developed for ATM communication networks. An ATM switch performs cell switching by storing ATM signals (cells) temporarily in a buffer memory (cell buffer memory). As described in "B-ISDN pictorial reader" (published by Ohm Sha on January, 1993) pp.74–75, different types of ATM switches have been proposed in accordance with the usage of the cell buffer memory. Among those ATM switches, a shared buffer type ATM switch which shares the cell buffer for all output parts as described in JP-A-2-1669 (corresponding to U.S. Pat. No. RE 34,305 issued on Jul. 6, 1993) is used widely.

Generally, an ATM switch comprises a cell buffer memory for storing cells, and a controller for storing cells in the cell buffer memory with timing control to avoid collision of cells for the same destination. As a cell buffer memory, generally, a static random access memory (SRAM) is used. The SRAM cell buffer requires a simple controller because it is easy in handling. To construct an ATM switch, commonly available SRAMs are externally connected to an LSI having the controller, or an ATM switch LSI having an embedded SRAM for the cell buffer in it is possible with the current device technology.

Recently, data traffic having burst characteristic has increased in ATM networks. A large capacity ATM switch having large cell buffer memories is desired so as to be tolerable against cell loss caused by burst inputs. If the cell buffer of the ATM switch is constructed by external RAMS, the switch throughput is restricted by the access speed of the external RAMs and the number of input/output pins between the LSI and the RAM. In the case of an ATM switch LSI with built-in SRAMS, it is difficult to achieve large cell buffers, because of the limited RAM area of the LSI. In order to solve this problem, it has been proposed to us e a dynamic random access memory (DRAM) as a cell buffer. A DRAM is simple in memory structure and small in mount area, therefore a large-capacity ATM switch with a large cell buffer can be possible using embedded DRAMs in LSI.

As described in "VLSI Memory" published by Baihukan (November, 1994) pp.101–110, a DRAM is constituted by a plurality of banks, each of which has a plurality of memory elements arranged in a matrix form, that is in the column direction and in the row direction. For data writing/reading execution an address of the DRAM is selected on the basis of the three parameters of column, row and bank. The access form in which both the bank and row are not changed but the column is changed is called column access. The access form in which the bank is changed regardless of the column and row is called bank access. The access form in which the bank is not changed but the row is changed regardless of the column is called row access. The difference of these access forms affects the access time and data output time (referred to as irregularity).

Specifically, with respect to the access time, high-speed access is possible in each of the column access and bank access. on the other hand, the row access requires an access time several times as long as that required in the column access or bank access. Further, high-speed data output of an accessed address can be performed in the column access but each of the bank access and row access requires data output time several times as long as that required in the column access. Furthermore, in all the access forms, the data read time in read access is longer than the data write time in write access.

That is, a DRAM can operates at a high speed with the highest-speed continuous access if data writing/reading is performed by continuous column access, that is, continuous read/write address is accessed. A DRAM is a suitable memory for storing burst data such as image data, computer system file data. In these cases, data is burst-written in the memory (continuous address write) and stored until the occasion demands and the data are burst-read from the memory if the occasion demands (continuous address read). On the other hand, applications which requires the three access forms in a random manner, that is, address selection for data reading/writing occurs at random, high-throughput cannot be expected because of the above-mentioned irregularity. Further, after predetermined time, stored data disappears because of electrical characteristic which is peculiar to the DRAM. Accordingly, in order to prevent this data disappearance, execution of data refreshing is required.

In case of a cell buffer memory used in the ATM switch, input cells asynchronously transferred from several input parts are switched to desired output parts which are the destination of the cells. More precisely, the cell buffer memory works as described below. Input cells successively transferred from several input ports are written into cell buffer memory addresses corresponding to the destination output ports and temporarily stored in the cell buffer. Then they are successively read out to the designated output ports, at intervals of a time matched with the throughput of the output lines. The destinations (switching destinations) of the input cells successively transferred to the switch are not determined by the switch, but determined by communication partners designated by the transmission side. Further, the interval and time of the arrival of cells are determined at random because the interval and time of the arrival of cells are asynchronous and depend on the traffic characteristic of the lines.

That is, in the cell buffer memory, inputting/outputting of cells having random destinations is executed substantially continuously based on random addresses. Furthermore, the random state of the cell input/output timing and address in the cell buffer memory varies randomly in accordance with the traffic characteristic in the network. Even if a predetermined rule is decided in advance to control the input/output of the cell buffer memory, the random state of the cell input/output timing and address varies in accordance with the state of the communication network.

If a DRAM is used as a cell buffer memory which has the aforementioned characteristic, the aforementioned three access forms occur at random. Accordingly, the irregularity of access causes a cell loss because of a possibility that the shortage of cell switching time. To avoid this, cells should be switched in the timing based on the consideration of the longest access time and longest data input/output delay of the DRAM. However, if the switching speed is reduced to avoid such a cell loss, switching throughput is lowered. Further, if the data refreshing operation is performed at suitable time intervals with cell inputting/outputting is executed substantially continuously, throughput is limited more.

Specifically, the switching speed considering the longest access time and longest data input/output delay of the DRAM is about ten-times longer than that of the SRAM. Accordingly, it is difficult to use a DRAM simply as an ATM switch cell buffer memory which requires high-throughput.

SUMMARY OF THE INVENTION

In order to solve the aforementioned problem, an object of the present invention is to provide an ATM switch which is large in capacity and high in throughput and which reduces cell loss by having a large cell buffer. Specifically, the object is to provide an ATM switch which uses a DRAM as a cell buffer memory, which is large in capacity and high in throughput with low cell loss possibility.

Another object of the present invention is to provide means and method for absorbing variation in access time and delay time caused by the different access forms of a DRAM, and to provide a switch which uses a DRAM having the above means and method, which is large in capacity and high in throughput with low cell loss possibility. That is, this object is to provide means and method for using a DRAM as a cell buffer memory of an ATM switch which is large in capacity and 25 high throughput with low cell loss probability.

More specifically, a further object of the present invention is to provide means and method for absorbing variation in access time and data write time caused by random write access of a DRAM memory and to provide an ATM switch with large capacity, high throughput, and low cell loss probability by using the means and method.

Further, still another object of the present invention is to provide means and method for absorbing variation in access time and data read delay caused by random read access of a DRAM memory and to provide an ATM switch with large capacity, high throughput, and low cell loss probability by using the means and method.

A still further object of the present invention is to provide means for giving refreshing timing which is necessary in a case of using a DRAM as a cell buffer memory to provide a high-throughput large-capacity ATM switch with the secure refreshing operation to prevent a cell loss in the switch.

In order to solve the aforementioned problem, the present invention provides an ATM switch to receive ATM cells from several input ports, then switch and output the cells to one of output ports comprising: a first memory using a DRAM for storing the cells; a second memory using an SRAM for switching (temporarily storing) the input cells before the input cells are transferred to the first memory; and a controller for generating write/read address and timing signals for the first and second memories. Further, the controller is configured to generate read address and timing signals for the second memory and write address and timing signals for the first memory taking variation in access time or delay time based on the access address of the first memory into account. In such a configuration, the cells switched by the second memory are further stored in the first memory. Consequently, a high-throughput large-capacity ATM switch is achieved by absorbing the variation in access time or delay time based on the access address of the first memory.

More specifically, the controller is constituted by a first address generating circuit for generating access addresses of the first memory, a second address generating circuit for generating access addresses of the second memory, a judgment circuit for judging the idle state of the second memory, and a timing circuit for generating, based on the output of the first address generating circuit, output timing signals for the first and second address generating circuits in accordance with variation in access time or delay time based on the access address of the first memory. In such a manner, the cells switched (temporarily stored) by the second memory are stored in the first memory again. Consequently, a high-throughput large-capacity ATM switch is achieved by absorbing variation in access time or delay time based on the access address of the first memory. Further, the controller performs controlling so that cell writing in the first memory and cell reading from the second memory are performed at a higher speed than the speed of cell writing in the second memory. Consequently, the ATM switch is be transferred to the first memory and variation in access time or delay time based on the access address of the first memory is absorbed.

A third memory using an SRAM with high-speed random read/write access may be further provided in the rear of the first memory using a DRAM. In such a manner, the ATM switch is configured so that variations in cell output timing to output ports are absorbed.

Furthermore, a refreshing circuit is provided in the controller so that a refreshing operation can be performed to prevent the stored cell data from disappearing. The ATM switch is configured so as to heighten the access speed of the first memory. As a result, the refreshing operation is executed in a vacant timing during cell transfer from the second memory to the first memory. Incidentally, because idle cells supplied to the ATM switch periodically are never switched, the ATM switch is also configured so that the refreshing operation can be performed in the first memory in the timing of the idle cells.

BRIEF DESCRIPTION OF THE DRAWINGS

FIG. 15 is a timing chart for explaining refresh operation of the DRAM cell buffer.

DESCRIPTION OF THE PREFERRED EMBODIMENT

In an ATM switch, according to the present invention, large-capacity DRAMs are used as a cell buffer memory for performing ATM cell switching. The occurrence of variation in memory access time, due to the irregularity of a DRAM caused by the characteristic of ATM cell switching is absorbed and, further, a refreshing operation is performed securely to thereby prevent the loss of ATM cells. Thus, a high-throughput large-capacity ATM switch is provided. The configuration and operation of the ATM switch according to the present invention will be described below in detail with reference to the drawings.

Figure 1:
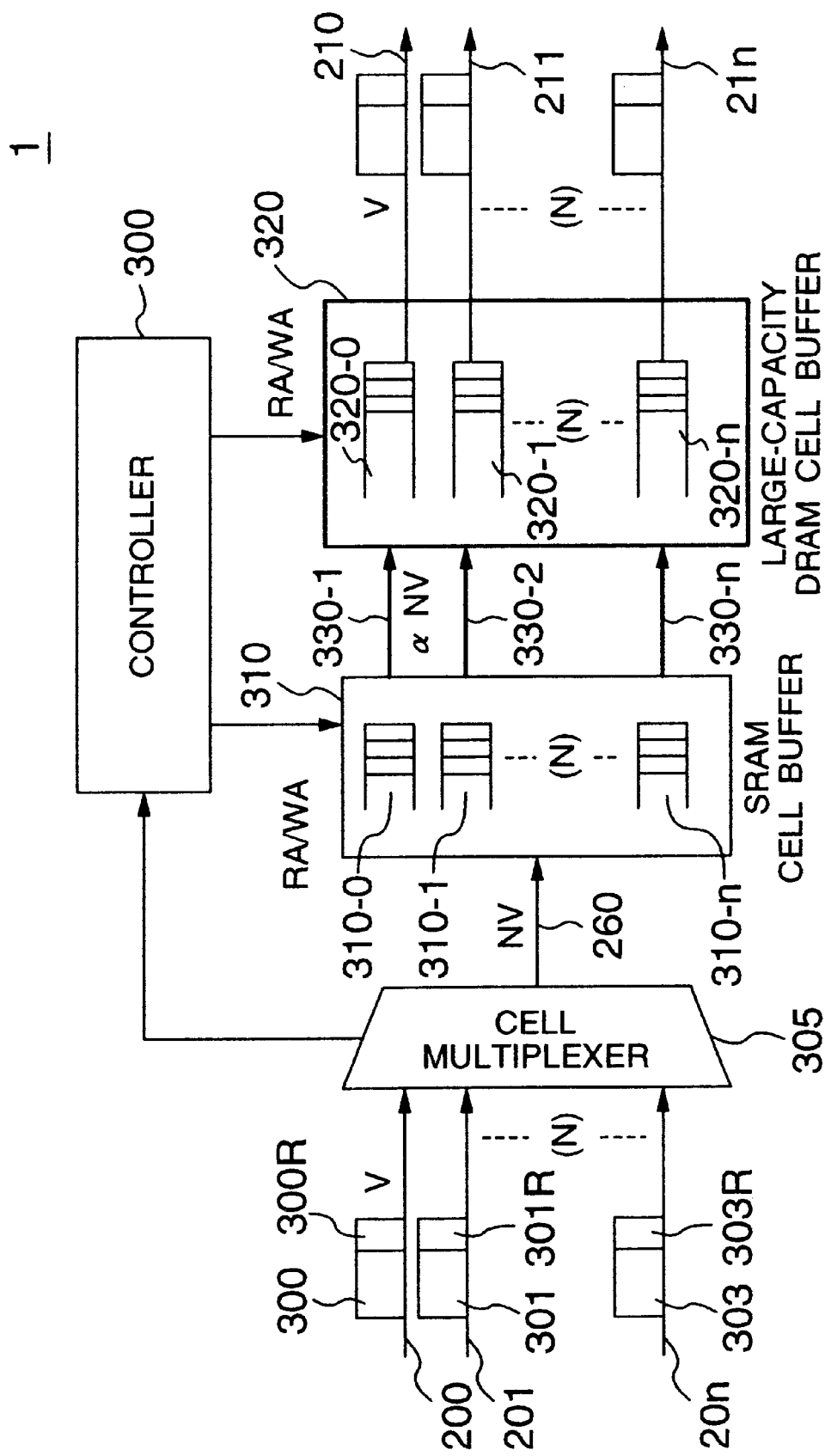
FIG. 1 is a block diagram showing a configuration of an ATM switch according to the present invention.

FIG. 1 is a block diagram showing an example of configuration of an ATM switch according to the present invention. The ATM switch 1 of the present invention is configured so that ATM cells supplied from a plurality (N+1 in this embodiment) of input highways 200 to 20$n$ are stored temporarily in a cell buffer 320 and switched to one of output highways 210 to 21$n$. The ATM switch 1 comprises a cell multiplexer 305 for multiplexing cells supplied from the input highways 200 to 20$n$, a cell buffer 320 using a DRAM for storing ATM cells, a cell buffer 310 using an SRAM for switching (temporarily storing) the input cells and controlling the cell input timing to the cell buffer 320, and a controller 300 for controlling the whole switch 1. Incidentally, the switch 1 is configured such that routing tags 300R to 30$n$R indicating switching destinations of input cells 300 to 30$n$ supplied from the input highways 200 to 20$n$ are given in advance at a line interface, or the like, of a switching system not shown whereby cells are switched on the basis of the routing tags 300R to 30$n$R. Of course, the switch 1 may be configured such that the controller makes a switching operation on the basis of VCI or VPI which is a cell identifier contained in a header of the ATM cell.

In the switch 1, the routing tags 300R to 30$n$R are taken out and fed to the controller 300 before or after the cells are supplied to the cell multiplier 210. According to the routing tags 300R to 30$n$R, the controller 300 temporarily switches (stores) the respective cells in queue buffers 310-0 to 310-$n$ having addresses corresponding to desired output lines formed in the SRAM cell buffer 310. Further, the cells are transferred to the DRAM cell buffer 320 in the timing of absorbing irregularity which will be described later. Each cell transferred to the DRAM cell buffer 320 is stored in any one of the queue buffers 320-0 to 320-$n$ of an address corresponding to the destination. The stored cells are read from the DRAM cell buffers 320-0 to 320-$n$ to the output highways 211 to 21$n$. According to the described procedure operation, ATM cell switching is performed. Incidentally, the queue buffers 310-0 to 310-$n$ constituted by an SRAM may be configured as a shared buffer type, which shares one memory with all the output ports, or an output buffer type switch, in which the cell buffer is divided physically for the respective output ports.

In the configured switch 1, when the speed of the input/output highways (each being N in number) is V, the speed after the cell multiplexer output is (N+1)V (260).

Accordingly, the controller 300 performs writing in the SRAM cell buffer 310 at this speed of (N+1)V. Cell transfer is carried out from the SRAM cell buffer 310 to the DRAM buffer independently for every output line. In order to absorb irregularity, the cell writing speed into the DRAM cell buffer 320 is selected to be $\alpha$(N+1)V (in which $\alpha$>1) (330). Specifically, the value of $\alpha$ is determined based on the characteristic (speed, etc.) of the DRAM and the speed and number of input/output highways so that the average access speed is (N+1)V, taking account of the access irregularity of the used DRAM. Accordingly, only small SRAM cell buffer 310 is required to smooth bursts due to the access irregularity of the DRAM. As described above, the switch according to the present invention comprises a small-capacity SRAM for switching and holding cells only for the required time for absorbing variation in memory access of the DRAM cell buffer, which provides a large-capacity cell buffer. Accordingly, a high-throughput large-capacity ATM switch can be constructed by providing the SRAM addresses in the way that the irregularity of the DRAM is absorbed. The details will be described later. Incidentally, the refresh timing of the DRAM can be generated if the write speed to the DRAM cell buffer is selected to be $\alpha'$, ($\alpha'>\alpha$)

Figure 2:
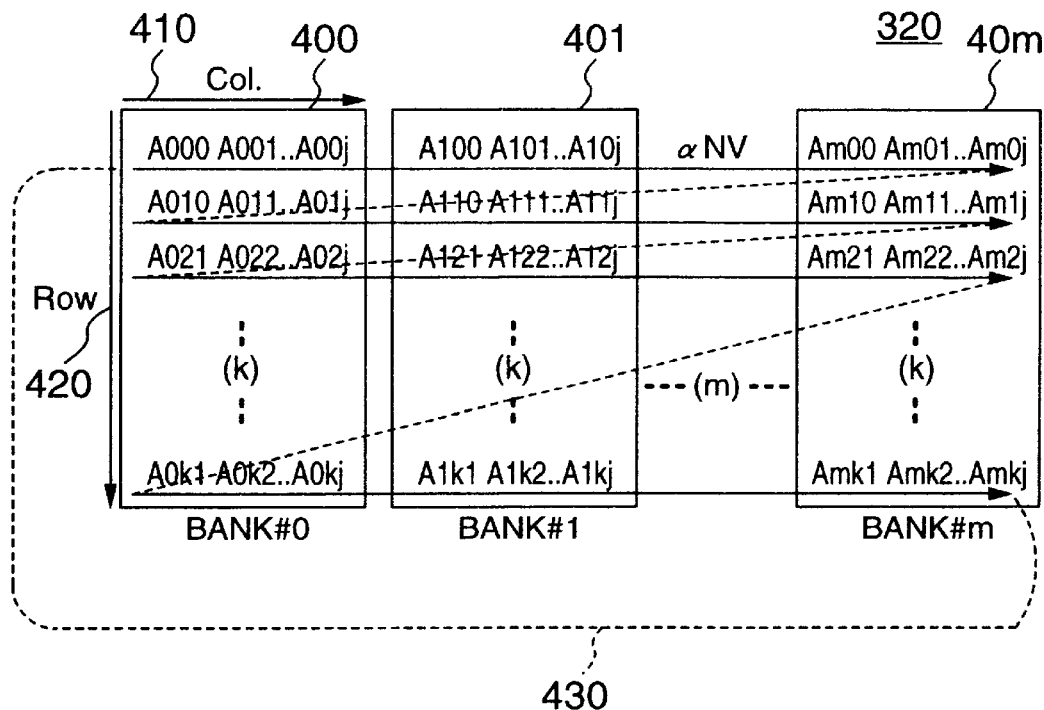
FIG. 2 is an explanatory view showing the way of giving write addresses to the cell buffer according to the present invention.
Figure 3:
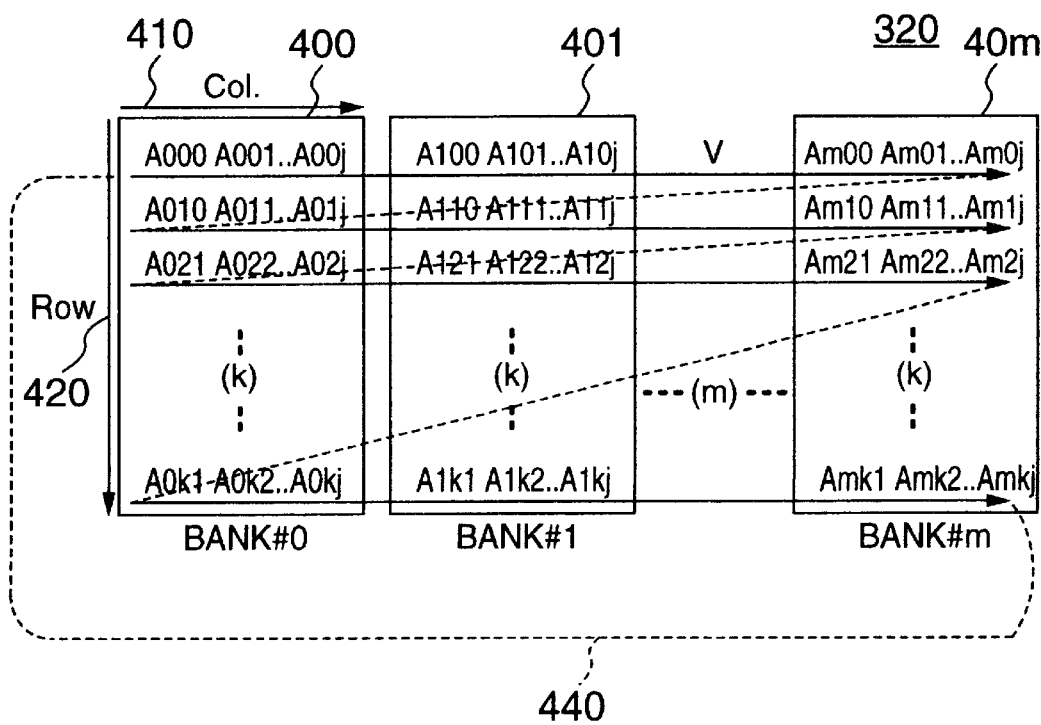
FIG. 3 is an explanatory view showing the way of giving read addresses to the cell buffer according to the present invention.

First, the way of giving the address of the DRAM cell buffer 320 will be described. FIGS. 2 and 3 are diagrams for explaining the structure of the DRAM cell buffer and the way of giving the addresses. FIGS. 2 and 3 show the write side and the read side, respectively. As shown in FIG. 2, the DRAM cell buffer is constituted by a set of banks 400 to 40$m$ having horizontal address columns 410 and vertical address rows 420. The way of giving the write address of the DRAM cell buffer is designated by the reference numeral 430 in FIG. 2. That is, cells which are supplied to the respective output lines are written into the RAM continuously by column access and bank access so that the access irregularity is reduced as much as possible. Write access is performed at the speed of $\alpha$(N+1)V) (period: 1/$\alpha$(N+1)V) as described above. In the case where there is no cell in the source SRAM 310 in the timing of each write access, write access is not performed. The read address is given from the DRAM cell buffer in the same sequence 440 as the sequence in write address as shown in FIG. 3. The read access speed is selected to be V (period: 1/V). As described above, in the DRAM cell buffer 320, read access is performed at the ratio of 1/$\alpha$(N+1) to write access.

Incidentally, even in the case where addresses are given by the aforementioned way, input/output of cells with continuous address access is not guaranteed because of the traffic characteristic of ATM cells as described preliminarily. However, an ATM switch operation is performed successively by writing cells into queue buffers for the respective output lines and reading cells to respective output lines from the buffer in predetermined timing in accordance with the through-put of the output lines. Accordingly, the DRAM write access and DRAM read access cannot be perfectly separated in terms of time, but write access and read access are mixed with each other. Furthermore, the DRAM basically has a one-port memory structure, in which the same data input/output port is used to access each memory element. Accordingly, in the case if read access is made on the way of continuous write access as described above and write access is re-started after read access, addresses are given discontinuously. Accordingly, it cannot be guaranteed which one of the column access, row access and bank access of the DRAM is selected as the access to the DRAM cell buffer 320. That is, random access must be taken into consideration to use the DRAM cell buffer.

Figure 4:
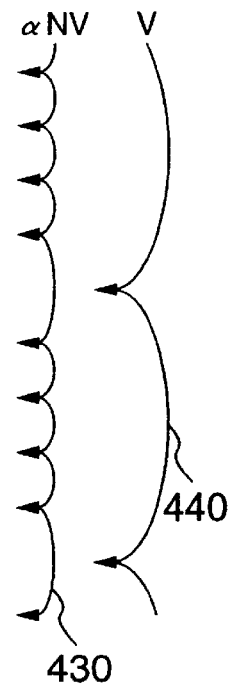
FIG. 4 is an explanatory view showing an example of the write and read operation of the cell buffer according to the present invention.
Figure 5:
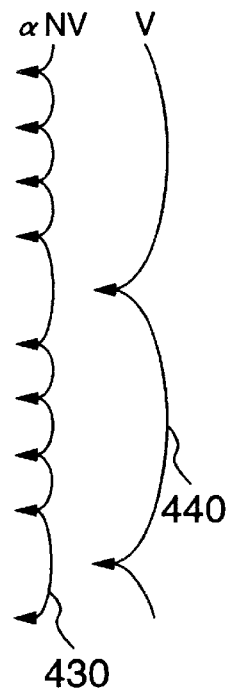
FIG. 5 is an explanatory view showing another example of the write and read operation of the cell buffer according to the present invention.

FIGS. 4 and 5 are diagrams for explaining random access form in the DRAM cell buffer 320. FIG. 4 shows an address sequence example 100 in which read access is inserted on the way of continuous write access, but column access is unchanged. This example may-occur in the condition that a cell written in the switch 1 (DRAM cell buffer 320) is read out relatively early. In FIG. 4, continuous addresses 000 to 003 are given to perform write access based on column access in the period of from t=0 to t=3. At timing t=4, address 000 is given to perform read access. In this occasion, the address 000 is discontinuous to the preceding address 003 but the access remains column access in the same bank. At timing t=5, address 004 is given to restart write access but the access remains column access on the basis of the relation between the address 004 and the preceding address 000. In this case, high-speed access can be made basically because the access is continuous column access, but a read operation at timing t=4 takes a longer time than the write operation, it requires a longer time at timing t=5 in the address A004 compared with the case where cells are written continuously. Accordingly, there is a limitation in high-speed access. FIG. 5 shows an address sequence example 110 in which continuous write access is changed into row access due to a switch/read operation on the way of the continuous write access. This example may occur in a condition that a cell written in the switch 1 (DRAM cell buffer 320) is read relatively late. In FIG. 5, continuous addresses 01j to 112 are given to perform write access based on column access and bank access in the period of from t=0 to t=3. At timing t=4, address 101 is given to perform read access. In this occasion, the address 101 is discontinuous to the preceding address 112 but access is made in the same bank but in different rows, that is, row access is made. At timing t=5, address 113 is given to restart write access but the access becomes row access again on the basis of the relation between the address 113 and the preceding address 101. In this case, row access is put on the way of continuous write access, therefor it takes a long time for access and data input/output because of the irregularity of the DRAM. Accordingly, the waiting time of thb-cell further increases in the write/read switch-ing timing as an example timing of t=5. Accordingly, that leads to a further limitation in high-speed access. Further, in the DRAM cell buffer 320, there is a probability that situations as shown in FIGS. 4 and 5 occur at random.

According to the present invention, a switch is provided with an SRAM cell buffer 310 before a cell buffer 320 to absorb the aforementioned irregularity so that a large-capacity DRAM can be used as a cell buffer. By focussing on the configuration and operation of a controller 300, the configuration and operation of the switch 1 will be described below more in detail.

Figure 6:
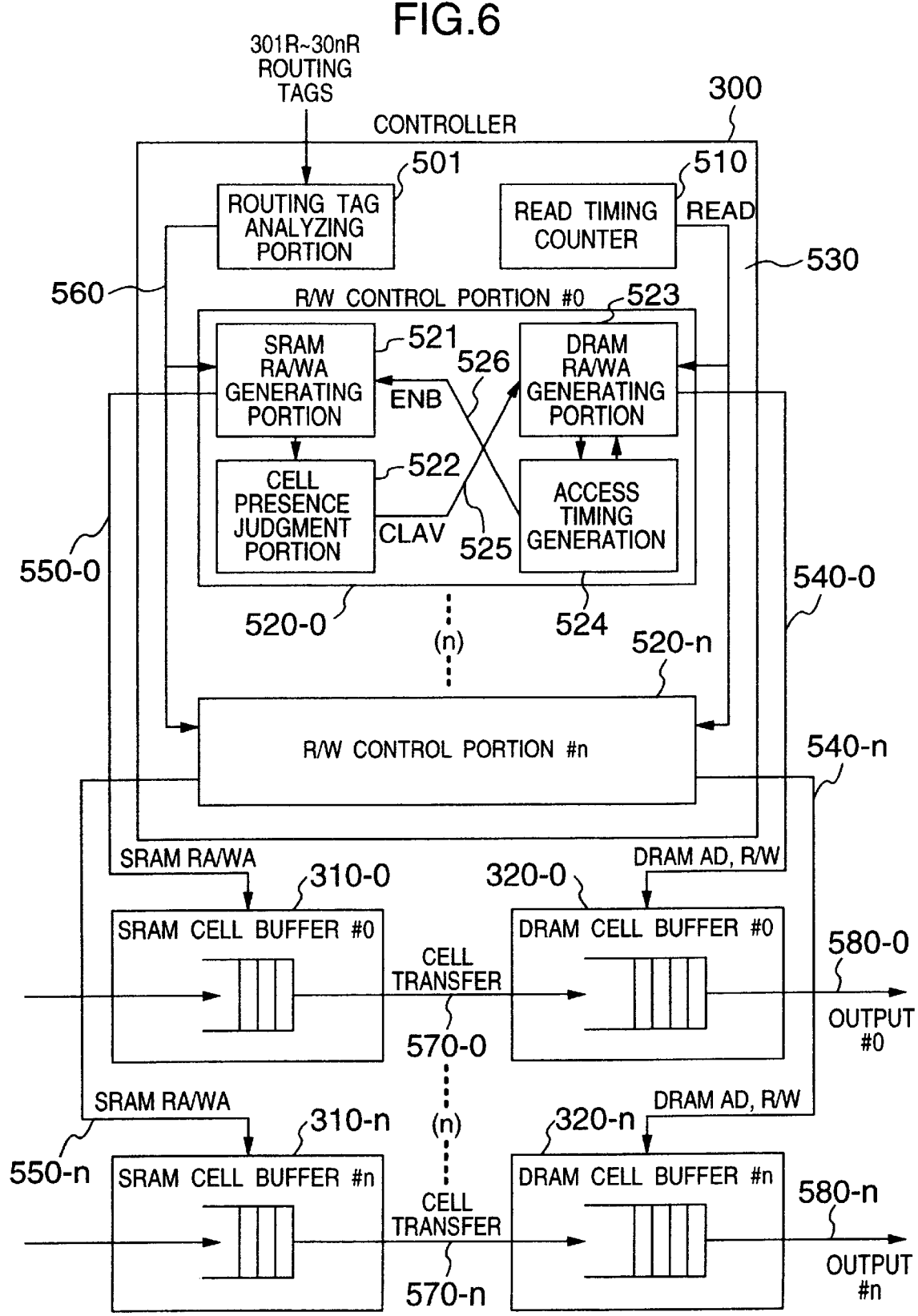
FIG. 6 is a block diagram showing the configuration of a controller contained in the ATM switch according to the present invention.

FIG. 6 is a block diagram showing the configuration of a controller contained in the ATM switch according to the present invention. The controller 300 includes a routing tag analyzing portion 501 for analyzing the desired output line for the cell on the basis of the routing tags 300R to 30nR, a read timing counter 510 for giving the timing of reading the cell from the DRAM cell buffer 320, and R/W control portions 520 (520-0 to 520-n) for controlling write/read of the SRAM cell buffer 310 and the DRAM cell buffer 320 to perform cell switching in the switch 1 by absorbing the irregularity of the DRAM.

The R/W control portions 520 control respective memories (SRAM 310 and DRAM 320) so that cells supplied at the speed (N+1)V are temporarily stored (switched) into the SRAM cell buffers 310 to corresponding output lines according to the information from the routing tag analyzing portion 501. Further, when the cells are transferred to the DRAM cell buffer at a speed α(N+1)V which is higher than (N+1)V, the R/W control portions 520 control the respective memories so that the cells are transferred with the timing to absorb the irregularity of the DRAM memory. Further, when cells are read out from the DRAM cell buffer 320 corresponding to every output line, the R/W control portions 520 control the respective memories in accordance with the timing instructed by the read timing counter 510 so that the read access of the DRAM cell buffer 320 is made at the speed V.

Figure 7:
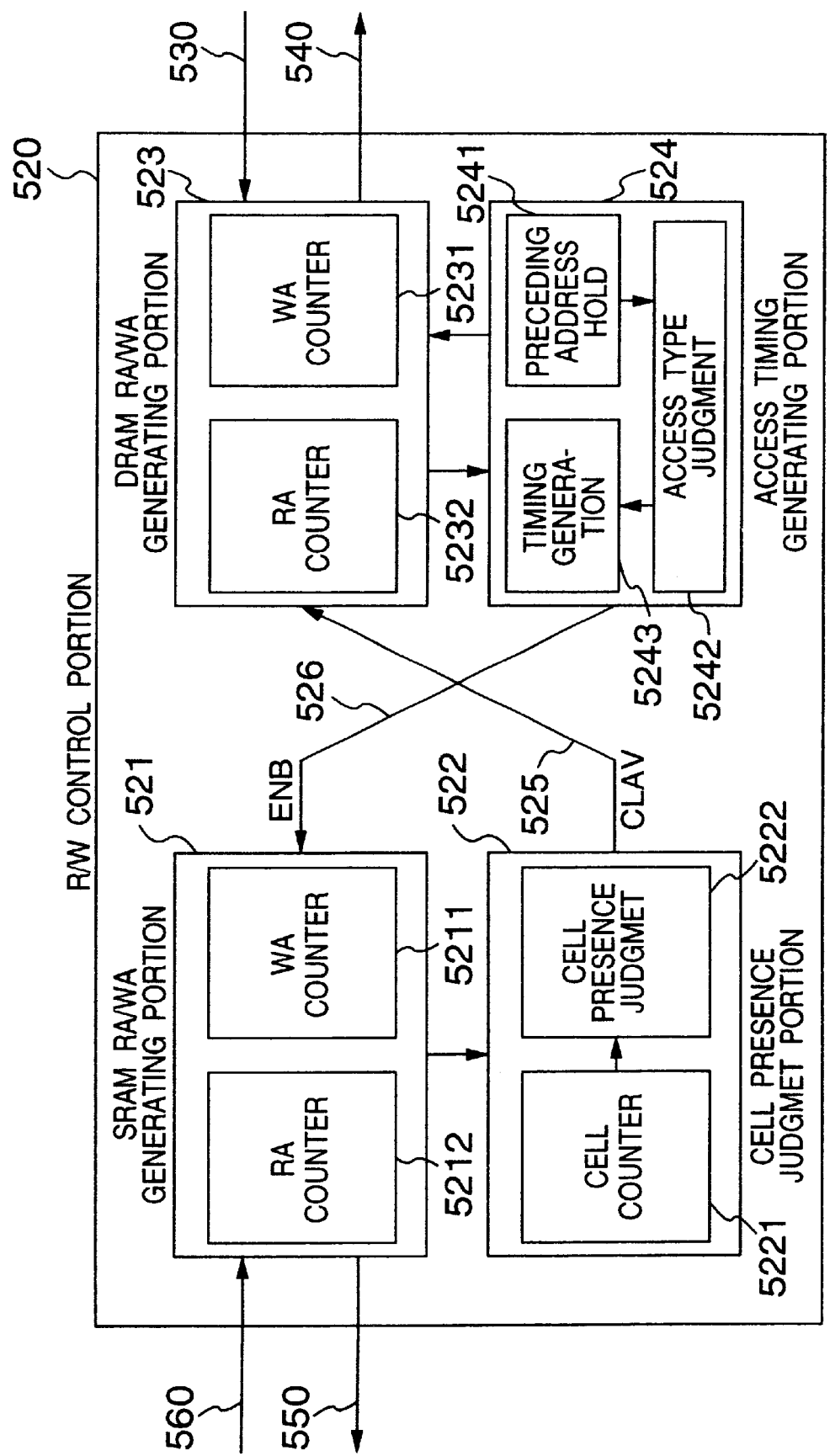
FIG. 7 is a block diagram showing the configuration of an R/W control portion contained in the controller according to the present invention.

FIG. 7 is a block diagram showing the detailed configuration of a R/W control portion. The R/W control portion 520 used for control of the ATM switch 1 according to the present invention contains: an SRAMRA/WA generating portion 521 having a WA counter 5211 for generating a write address of the SRAM cell buffer 310, and an RA counter 5212 for generating a read address of the SRAM cell buffer 310; a cell presence judgment portion 522 having a cell counter 5221 for counting the number of cells stored in the SRAM cell buffer 310, and a judgment circuit 5222 for judging whether any cell is present or not; a DRAMRA/WA generating portion 523 having a WA counter 5231 for generating a write address of the DRAM cell buffer 320, and an RA counter 5232 for generating a read address of the DRAM cell buffer 320; and an access timing generating portion 524 having an address hold circuit 5241 for storing the preceding access address of the DRAM cell buffer 320, an access type judgment circuit 5242 for making access form analysis as to which one of the column access, bank access and row access takes place as the current access of the DRAM cell buffer 320, by comparing the current access address and the preceding access address, and a timing generating circuit 5423 for calculating access timing on the basis of the access type and generating access timing of the SRAM cell buffer 310 and the DRAM cell buffer 320 to absorb the irregularity.

In this configuration, an access address of the DRAM cell buffer is generated based on the judgment as to whether any cell is present (signal: CLAV 525) in the SRAM cell buffer 310 or not. Further, both the read timing (signal: ENB) of the SRAM cell buffer 310 and the write timing of the DRAM cell buffer 320 are adjusted to control cell transfer between the SRAM cell buffer 310 and the DRAM cell buffer 320. The cell buffers 310 and 320 operate on the basis of memory control signals such as address signals, or the like, supplied through control lines 550 and 540 by the SRAMRA/WA generating portion 521 and the DRAMRA/WA generating portion 523, respectively. Incidentally, the read access timing of the DRAM cell buffer 320 is notified to the DRAMRA/WA generating portion 523 on the basis of a signal READ 530 from the read timing counter 510.

Figure 8:
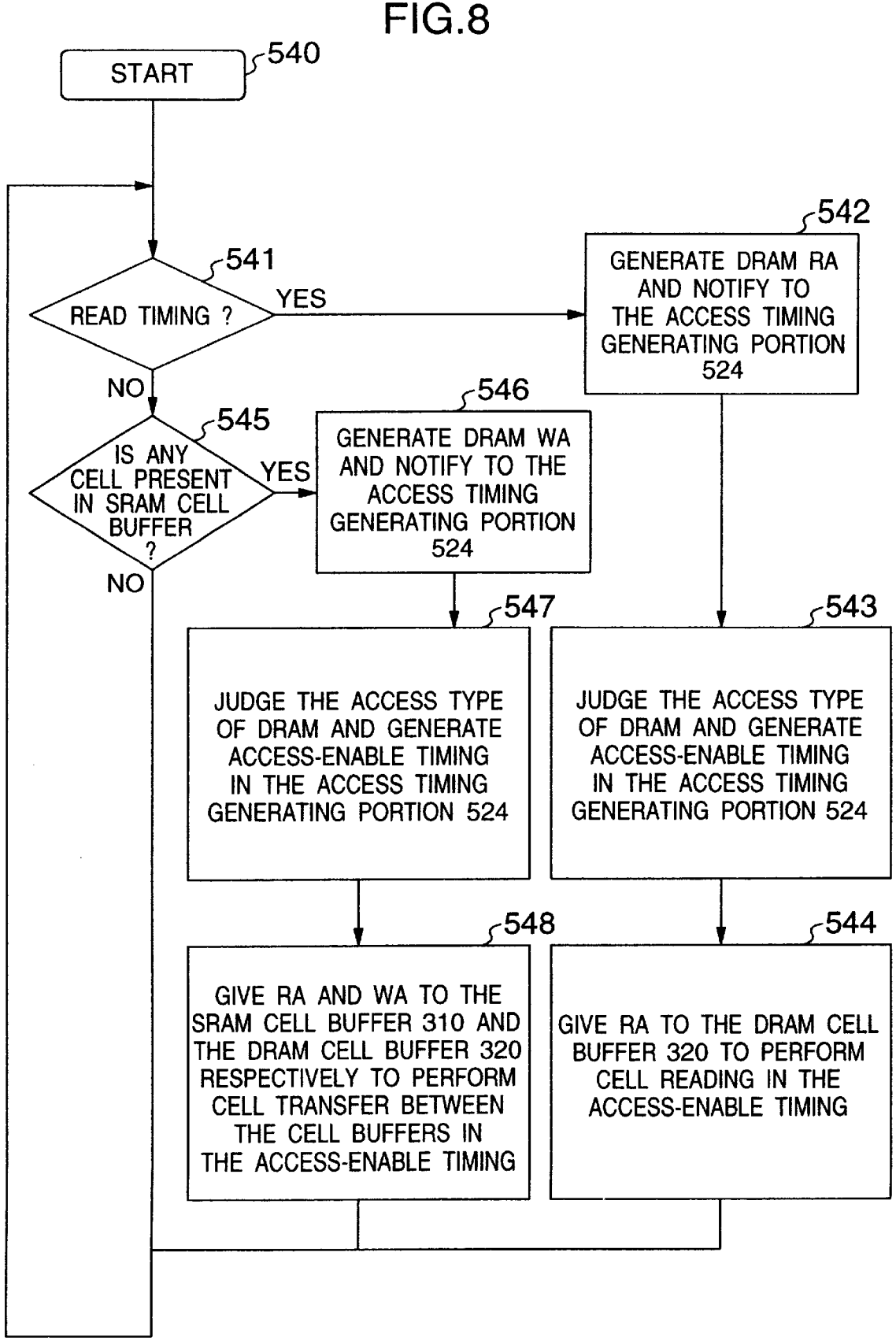
FIG. 8 is an operational flow chart for explaining a procedure of write and read control of cell buffers in the controller according to the present invention.

FIG. 8 is an operational flow chart for explaining the read/write operation of the DRAM cell buffer 320 controlled by R/W control portion 520. Referring to FIG. 8, the operation of the controller in the ATM switch 1 which was explained in details in FIGS. 6 and 7 will be described below. Specifically, in a condition that an arrival cell has been stored (switched) into the SRAM cell buffer 310 corresponding to the output line on the basis of information from the routing tag analyzing portion 501, an operation of transferring the cell stored in the SRAM cell buffer 310 to the DRAM cell buffer 320 by means of the R/W control portion 520 and an operation of reading the cell from the DRAM cell buffer 320 in a specific timing will be described.

First, the DRAMRA/WA generating portion 523 judges, on the basis of the output of the read timing counter 510, whether the timing is cell read timing or not (step 541).

When the judgment in the step 541 shows that it is read timing, the DRAMRA/WA generating portion 523 calculates a read address of the DRAM cell buffer 320 and notifies the read address to the access timing generating portion 524 (step 542).

The access timing generating portion 524 judges the access type on the basis of comparison of the DRAM read or write address in the preceding timing with the received read address and generates access-enable timing peculiar to the access (step 543).

The DRAMRA/WA generating portion 523 outputs a read instruction (signal: R) to read the cell from the DRAM cell buffer 320 and a read address onto the control line 540 at the access-enable timing, so that the cell stored in the DRAM cell buffer 320 is read at an appropriate timing (step 544).

When the result of the judgment in the step 541, contrariwise, shows that it is not read timing, the DRAMRA/WA generating portion 523 judges, on the basis of the CLAV signal 525 received from the cell presence judgment portion 522, whether any cell transferred from the SRAM cell buffer 310 is prepared or not (step 545).

When the step 545 shows the presence of some cells to be transferred, the DRAMRA/WA generating portion 523 calculates the write address of the DRAM cell buffer 320 and notifies the write address to the access timing generating portion 524 (step 546).

The access timing generating portion 524 judges the access type on the basis of comparison of the DRAM read or write address in the preceding timing with the received write address and generates access-enable timing corresponding to the access type (step 547).

In the access-enable timing, the DRAMRA/WA generating portion 523 outputs a write instruction (signal: W) to write the cell into the DRAM cell buffer 320 and a write address onto the control line 540 and sends an ENB signal 526 to the SRAMR/W generating portion 521. Upon reception of the ENB signal 526, the SRAMR/W generating portion 521 notifies the read address to the SRAM cell buffer and reads out the cell (step 548).

According to the explained procedure in the R/W control portion 520, cell transfer between the cell buffers and cell reading from the DRAM cell buffer 320 can be made. Incidentally, in order to perform the cell data transfer efficiency, as shown in FIGS. 2 and 3, addresses are given so that the read/write access of the DRAM cell buffer 320 is performed continuously by column access and bank access. Thus, large in access delay and data output delay caused by row access is basically avoided as much as possible in the aforementioned manner, therefore the influence of access irregularity which is a disadvantage of a DRAM is reduced as much as possible.

Figure 9:
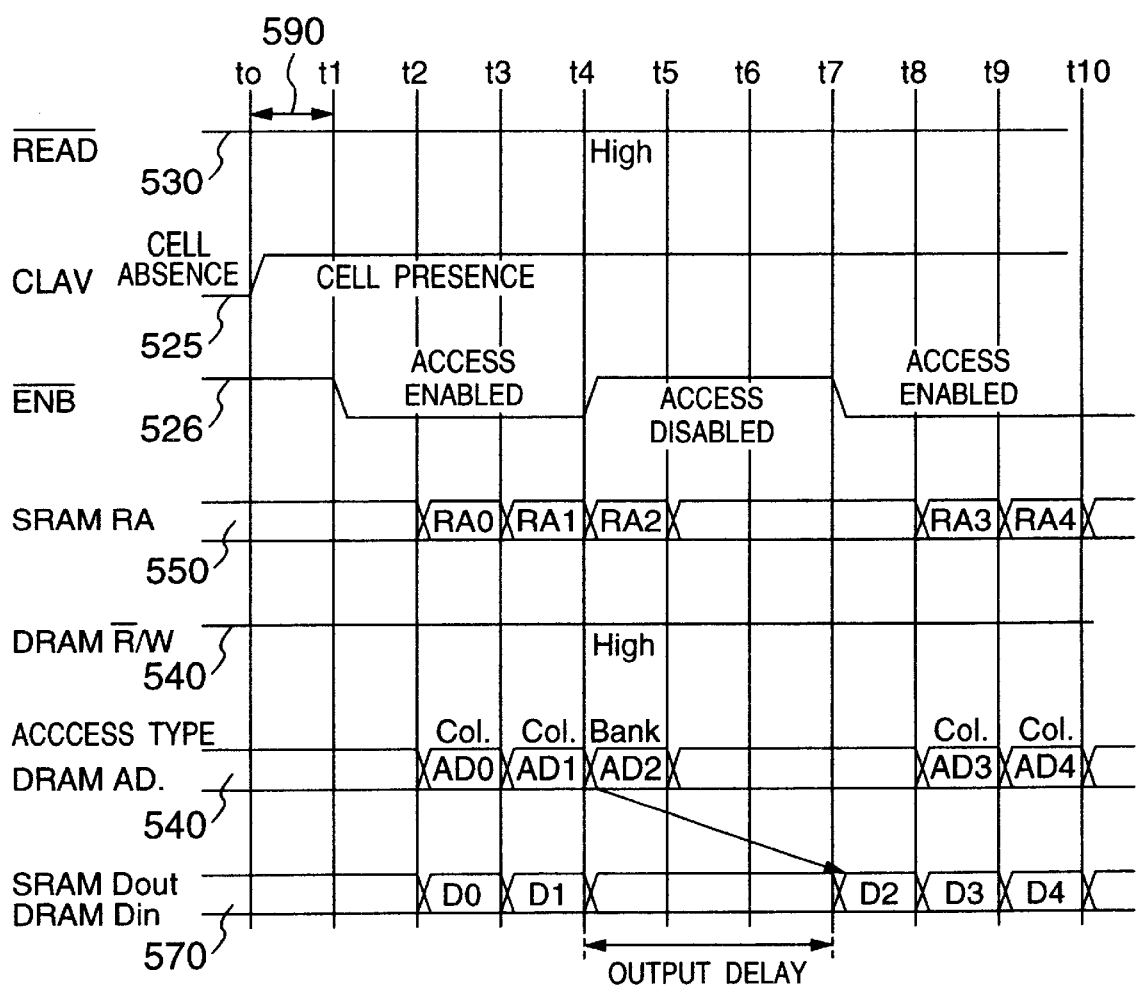
FIG. 9 is a timing chart for explaining operations of the controller and cell buffers according to the present invention.

Further, the operation of the ATM switch according to the present invention will be described below with reference to the drawings. FIG. 9 is a timing chart for explaining the operation of the ATM switch 1 according to the present invention. FIG. 9 shows an example of cell transfer timing between cell buffers.

At timing t0, there is no cell to be read in the SRAM cell buffer 310, therefore cell transfer is not performed. When the DRAMRA/WA generating portion 523 detects any cells to be transferred from the SRAM cell buffer 310 on the basis of the CLAV signal at timing t1, the DRAMRA/WA generating portion 523 generates a write address WA of the DRAM cell buffer 320 and notifies the write address to the access timing generating portion 524. (In the SRAMRA/WA generating portion 521, the read address RA of the SRAM 310 is generated). The access timing generating portion 524 makes a decision, on the basis of the received WA, that data transfer between cell buffers can be made in the next timing t2. Accordingly, the access timing generating portion 524 transmits the ENB signal 526 to the SRAMRA/WA generating portion 521 and the DRAMRA/WA generating portion 523. At timing t2, the SRAMRA/WA generating portion 521 and the DRAMRA/WA generating portion 523 detect the ENB signal 526 which shows cell transfer is enabled, and start the transfer of cell data D0. (In this occasion, RA of the SRAM and WA of the DRAM are RA0 and AD0 respectively and writing to the DRAM is performed by column access). At timing t3, similarly, cell data D1 is transferred. Although the access of the DRAM at timing t2 and t3 is column access, the access timing generating portion 524 disables the ENB signal when it makes a decision that the access of the DRAM 320 at timing t4 is bank access. This is because the output delay (irregularity) of the DRAM caused by bank access occurs, cell transfer cannot be made in the period of from timing t5 to timing t7. Further, if the access timing generating portion 524 makes a decision that access can be made at timing t8 after calculating the output delay caused by bank access, the ENB signal 526 is enabled again at the preceding timing t7. Because transfer of cell data D2 corresponding to AD2 by bank access at timing t4 is completed before t7, the follow-ing data can be transferred by column access again from t8. Transfer from the SRAM cell buffer 310 to the DRAM cell buffer 320 can be made by the cell buffer control method like the examples described above.

Reading of a cell from the DRAM cell buffer will be described below. Because the DRAM is basically 10 one-port RAM as described above, the read access type changes into any one of column access, bank access and row access in accordance with the preceding write access. That is, the DRAM access form changes in a range of from an access form least affected by irregularity, e.g., read access is column access and write access just after the read access is also column access, to an access form affected most by irregularity, e.g., read access is row access and write access just after the read access is also row access.

Figure 10:
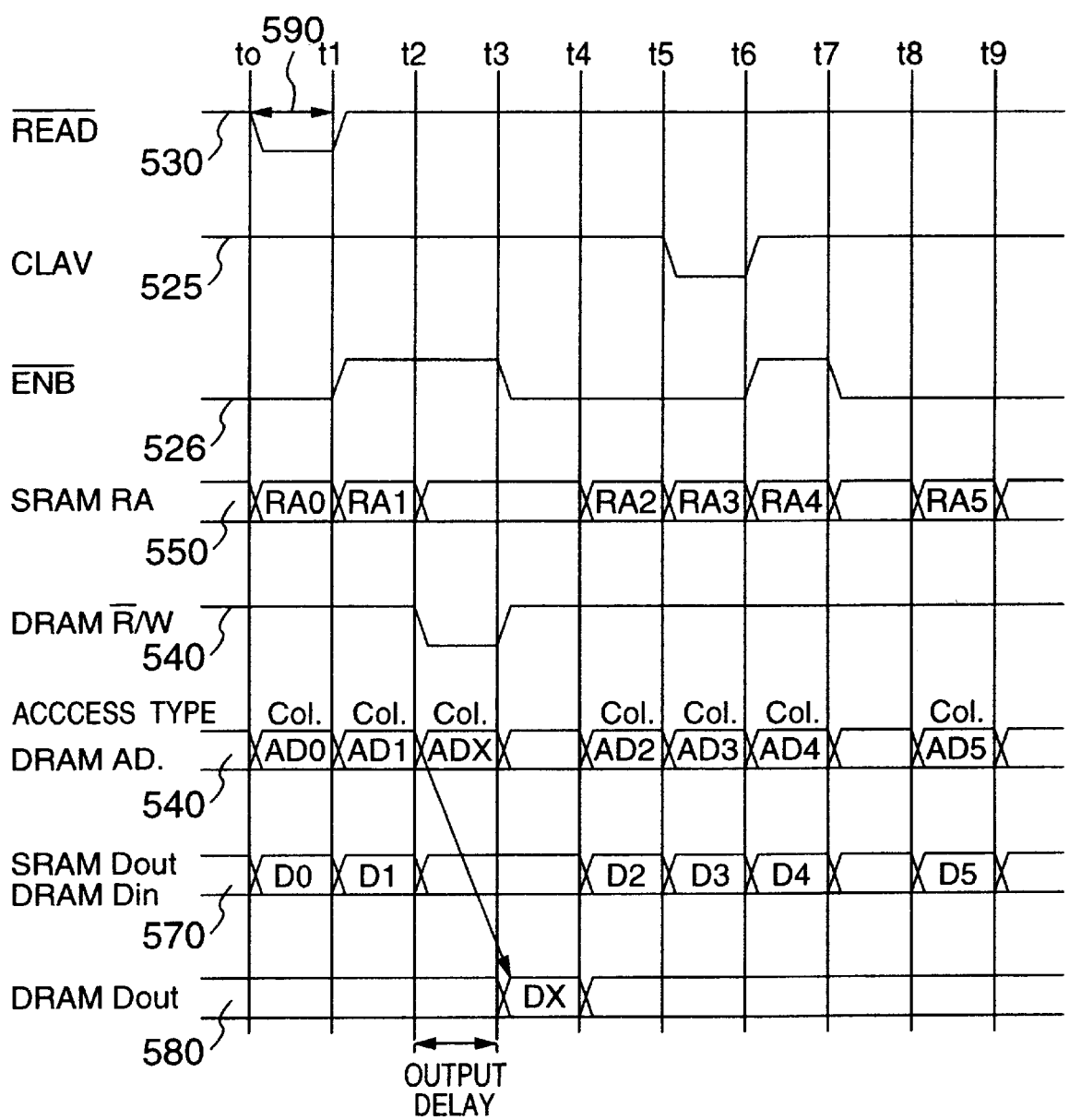
FIG. 10 is a timing chart for explaining other operations of the controller and cell buffers according to the present invention.

FIG. 10 is a timing chart for explaining the operation of the ATM switch 1 according to the present invention. FIG. 10 shows, as an example, a case when read access is column access at the timing of reading a cell from the DRAM cell buffer 320. Because the read speed to the output line side is V, reading can be made with a frequency of $1/\alpha(N+1)$ of the DRAM write speed $\alpha(N+1)V$. This timing is notified to the DRAMRA/WA generating portion 523 on the basis of the READ signal 530 from the read timing counter 510 in the controller 300.

When read access timing is notified at timing t0, the access timing generating portion 524 disables the ENB signal 526 at timing t1 to stop cell transfer from the SRAM cell buffer 310. At timing t2, read access is started by sending the read access type and read address to the DRAM cell buffer 320 through the R/W signal 540. Further, because data output delay occurs in read access compared with write access in terms of characteristic of the DRAM, next write access cannot be performed immediately at the next timing t3. Accordingly, the ENB signal 526 is still kept disabled at timing t2. Because cell transfer can be made at timing t4, the ENB signal 526 is enabled at the preceding timing t3. Cell data DX, which corresponds to the read address ADX given at timing t2, is read at timing t3 and cell transfer is re-started from next timing t4.

FIG. 10 also shows an example of a case when cell transfer is temporarily interrupted. Specifically, when there is no cell to be read in the SRAM cell buffer 310, at timing t5, this is notified to the DRAMRA/WA generating portion 523 through the CLAV signal 525. At the next timing t6, the ENB signal 526 is disabled to stop cell transfer. As a result, cell transfer is not performed at timing t7. When the presence of some cells in the SRAM cell buffer 310 is confirmed at timing t6, the ENB signal 526 is enabled again at timing t7 so that cell transfer is re-started from t8.

Figure 11:
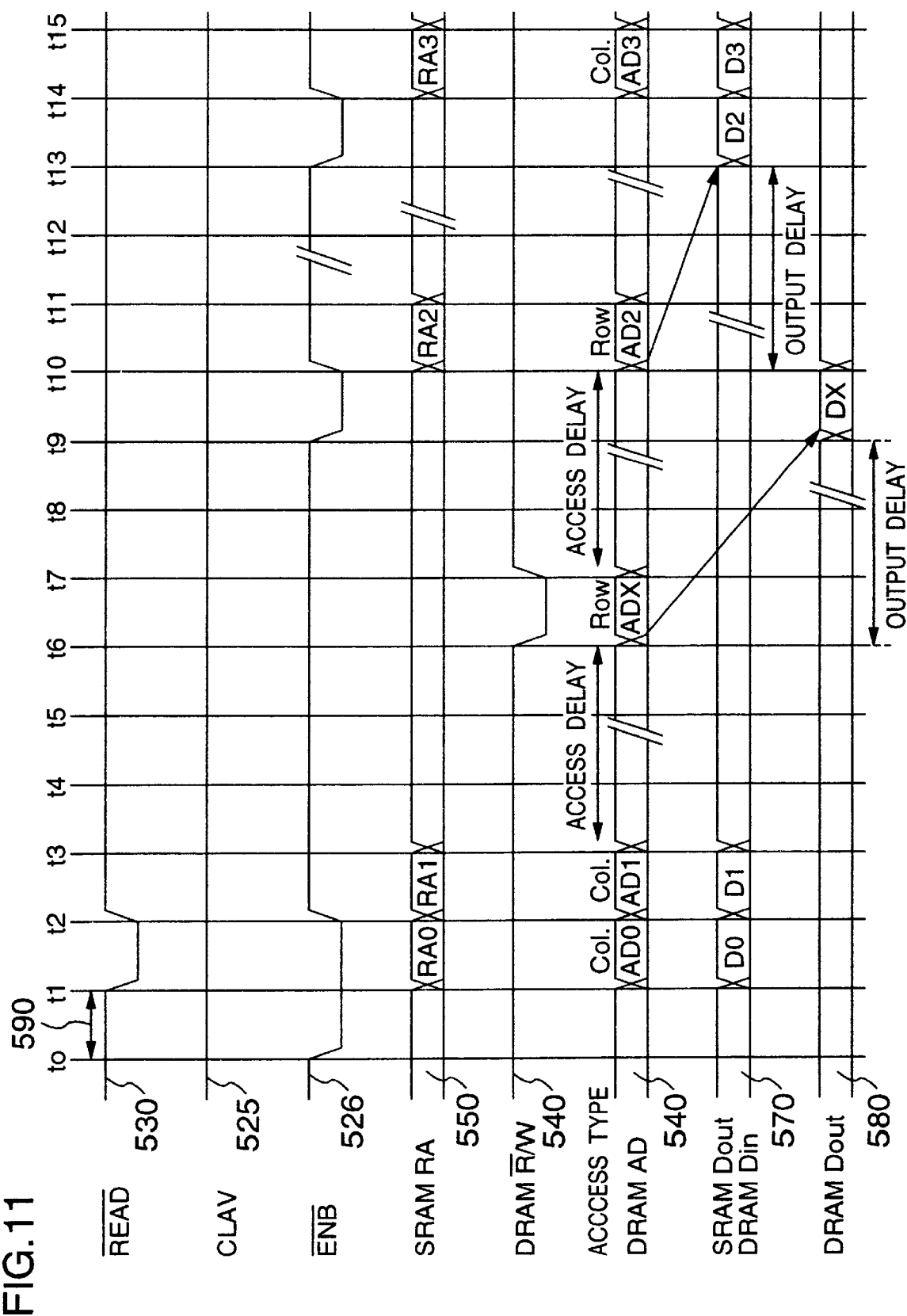
FIG. 11 is a timing chart for explaining still other operations of the controller and cell buffers according to the present invention.

FIG. 11 is a timing chart for explaining the operation of the ATM switch 1 according to the present invention. FIG. 11 shows, as an example, a case when read access of the DRAM cell buffer 320 and write access following the read access are both row access.

When read access timing is notified to the DRAMRA/WA generating portion 523 through the READ signal 530 at timing t1, the ENB signal 526 is disabled at the next timing t2 to stop cell transfer from the SRAM cell buffer 310. At timing t2, the access timing generating portion 524 compares the read address ADX with the preceding write address AD1. After a decision is made that the access is row access, the access timing generating portion 524 calculates access delay caused by irregularity and controls the DRAMRA/WA generating portion 523 so that the read address ADX is send to the DRAM cell buffer 320 at timing t6.

Incidentally, data corresponding to the address ADX is output at timing t9. Further, at timing t9, the ENB signal 526 is enabled for the next cell transfer, but the ENB signal 526 is disabled at the next timing t10 because the next DRAM access type is also row access. After cell data D2 corresponding to the address AD2 given at timing t10 is transferred, cell transfer between cell buffers by column access or bank access is restarted.

As described above in the configuration and operation of the ATM switch according to the present invention, the read timing of the DRAM cell buffer 320 varies according to the cell read access type of the each output line. Accordingly, the cell output timing may vary between output lines.

Figure 12:
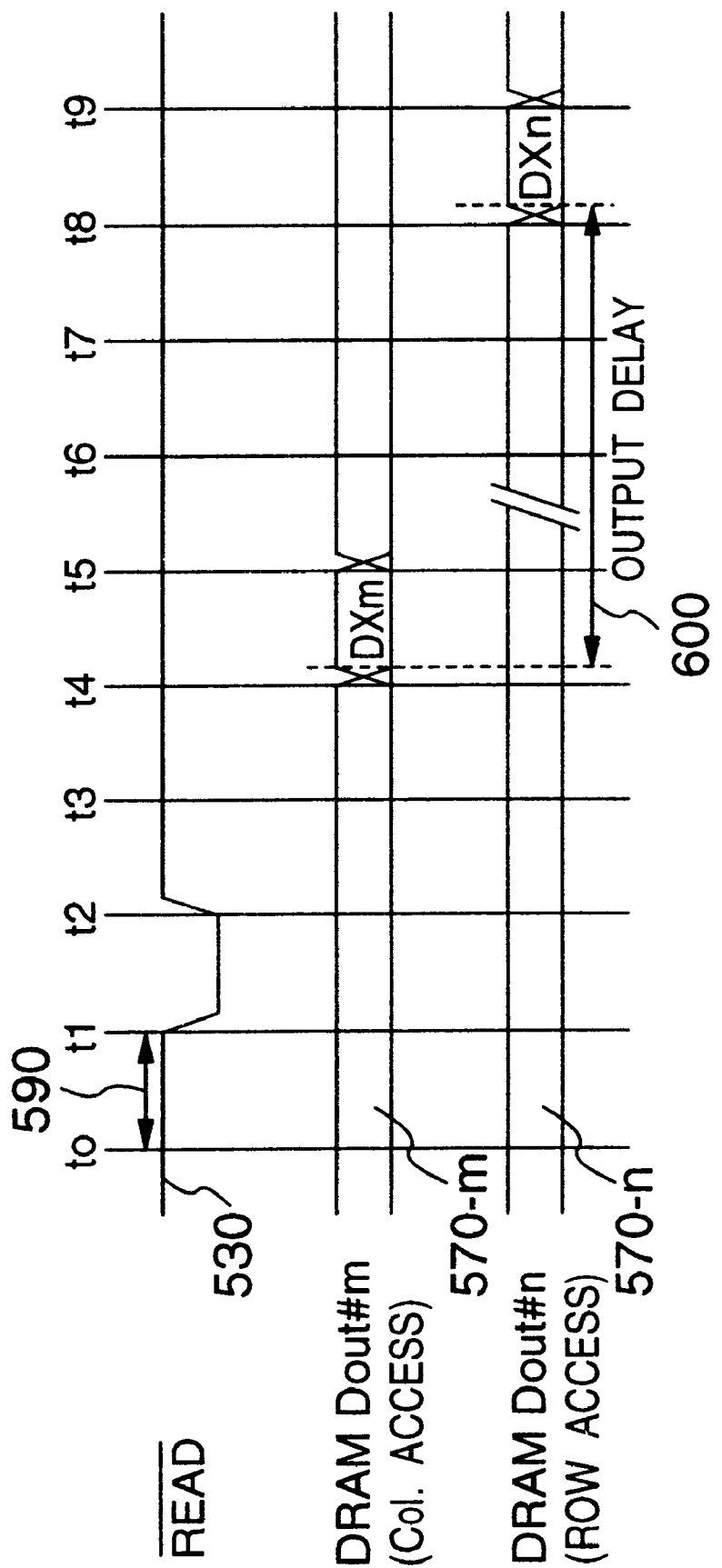
FIG. 12 is a timing chart for explaining further operations of the controller and cell buffers according to the present invention.

FIG. 12 is a timing chart for explaining the operation of the ATM switch according to the present invention. FIG. 12 shows a case when the cell output timing varies among the output lines as described above. In FIG. 12, a cell is read by column access in circuit #m at read timing t1, but a cell is read by row access in circuit #n at the same read timing t1. As a result, a cell output delay difference 600 occurs.

Figure 13:
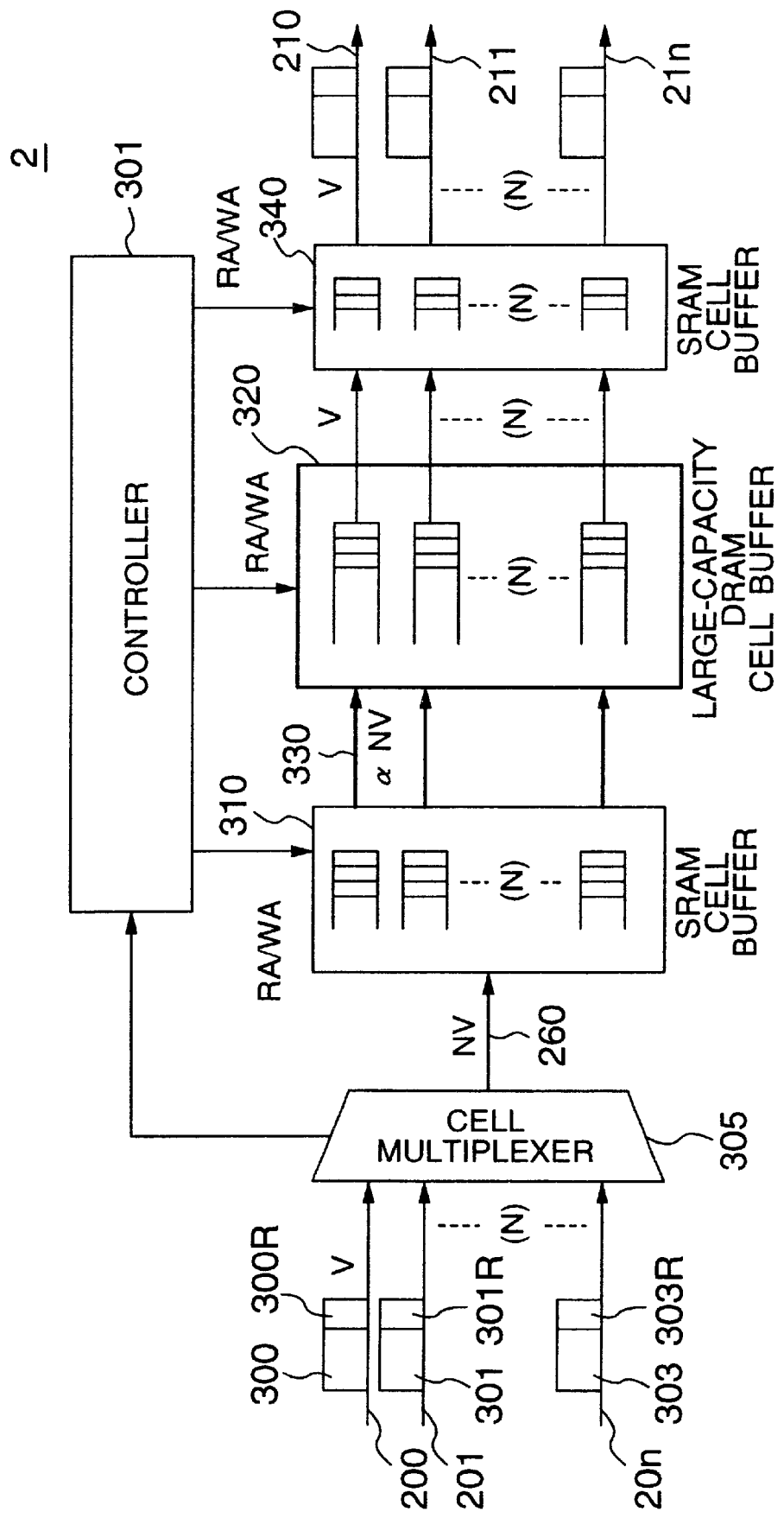
FIG. 13 is a block diagram showing another configuration of the ATM switch according to the present invention.

According to the present invention, the delay difference among the output lines can be absorbed. FIG. 13 is a block diagram showing another example of configuration of the ATM switch according to the present invention. The ATM switch has a function of absorbing the delay difference among the output lines. The ATM switch 2 of the present invention is configured so that an SRAM cell buffer 340 for absorbing the output delay difference is provided after the DRAM cell buffer 320 of the ATM switch 1 described preliminarily. A controller 301 is provided so that the DRAM cell buffer 320 and the SRAM cell buffer 340 can cooperate with each other to absorb the delay difference in the same manner as the DRAM cell buffer 320 and the SRAM cell buffer 310 to absorb DRAM irregularity. By the absorption of the delay difference, cells are supplied to all the, output lines at the same timing. Incidentally, a high-speed SRAM having a cell buffer capacity of about one cell is used as the delay absorbing cell buffer 340.

With respect to cell reading from the delay absorbing cell buffer 340, the controller 301 generates timing which is obtained by adding the row access delay to the read timing so that cells are read simultaneously from delay absorbing cell buffers 340 (340-0 to 340-n) corresponding to all the output lines.

The refreshing operation of the DRAM cell buffer will be described below. A DRAM is different from an SRAM in that a refreshing operation must be carried out at certain intervals to prevent stored data from disappearing. That is, it is necessary to generate refresh timing and to carry out a refreshing operation while cells are supplied sequentially to the cell buffer to be temporarily stored and switched. To generate the refresh timing of the DRAM cell buffer 320 in the ATM switch 1 or 2 according to the present invention, the operating speed of the DRAM is selected to be slightly higher than the speed of input/output lines.

Figure 14:
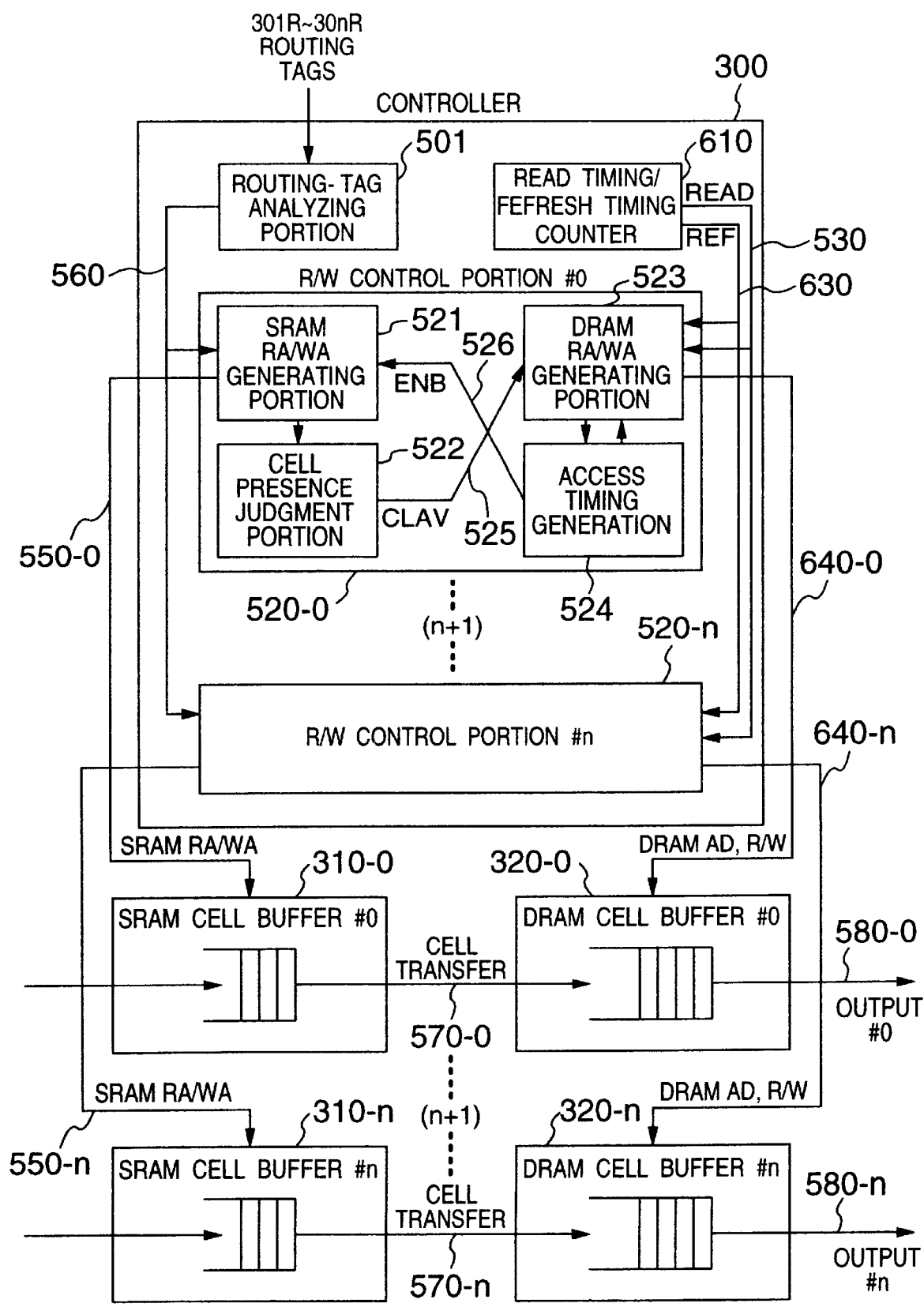
FIG. 14 is a block diagram showing another configuration of the controller in the ATM switch according to the present invention.

Specifically, referring to the configuration diagram of the switch in FIG. 1, cells input or output through (N+1) lines at the speed V in the ATM switch 1. Accordingly, taking DRAM irregularity into account, the input speed of the DRAM is selected to be $\alpha'(N+1)V$ (in which $\alpha1>\alpha$) which is a value larger than (N+1)V in average. The input cells are written into the SRAM cell buffer 310 at the speed (N+1)V and read from the SRAM cell buffer 310 at the speed $a(N+1)V$, whereby the refresh timing necessary for the DRAM cell buffer 320 is secured. Incidentally, the refreshing circuit is constituted by the same circuit as a general DRAM refreshing circuit. In the present invention, the controller 300 or 301 is provided with the refreshing circuit so that the refreshing operation is carried out on the DRAM cell buffer 320 in specific timing. In the concrete, as shown in FIG. 14, a read timing/refresh timing counter 610 is provided in the controller 300 and generates read timing signal 530 and refresh timing signal 630. The R/W control portion 520 halts the read/read access operation and performs the refresh operation of the DRAM cell buffer 320 during the notified refresh timing. A refresh timing allocation example is shown in FIG. 15.

At a line interface (disposed in the outside of the ATM switch according to the present invention but not shown) of a general ATM switching system, ATM cells are mapped on transmission frames such as SONET or SDH, which is defined in ITU-T Recommendation. When overhead of the transmission frames is removed in taking out ATM cells, absent information portions are generated at intervals of a predetermined time. Accordingly, an idle cell (switch internal idle cell) indicating the absence of information is inserted in the switch so that the timing in the absent information portions is matched with the transmission path speed. In case, the line speed is typically 155.52 Mbit/s, switch interval idle cell are inserted at the ratio of one cell to 53 cells. This is equivalent to the fact that the switch is operated at a throughput speed higher by 1/52 than the cell throughput to be processed in the switch. Accordingly, the refresh problem peculiar to a DRAM can be solved by use of the timing of switch internal idle cell inserted periodically as the refresh timing of the DRAM cell buffer without heightening cell transmission speed to the DRAM cell buffer. That is, in case that DRAM is configured to be refresh-completed during 1/53 time period of write access timing, the time period can be exclusively used for refresh. Therefore, the refresh operation is performed without making the cell transfer speed to DRAM higher.

According to the present invention, irregularity which occurs in access time and data output delay due to the access form peculiar to a DRAM in the case when a DRAM is used as a cell buffer in the ATM switch, can be absorbed. As a result, a large-capacity cell buffer which could not be provided conventionally can be given to the high-throughput ATM switch.

What is claimed is:

1. A communication apparatus which receives cells from an input line, stores said received cells, and transfers said stored cells to one of a plurality of output lines based on information of destinations of said cells, said communication apparatus comprising:

a first memory which stores said cells received from said input line, wherein said received cells are divided according to a destination of each of said received cells and said received cells are stored in divided form according to destination;

a second memory which stores said received cells to be transmitted from said input line to one of said output lines before said cells are supplied to said first memory, wherein said received cells are divided according to a destination of each of said received cells and said received cells are stored in divided form according to destination; and a controller which generates write address and timing signals for said first memory and read address and timing signals for said second memory based on a first memory access time or a delay time depending on an access of said first memory, cell storing status in said second memory, and information indicating destinations of said cells.

2. A communication apparatus which receives cells from an input line, stores said cells, and transfer said stored cells to one of a plurality of output lines based on information of destinations of said cells, said communication apparatus comprising:

a first buffer memory which stores said cells to be transferred from said input line to one of said output lines based on destinations of said cells received from said input line, wherein said received cells are divided according to a destination of each of said received cells and said received cells are stored in divided form according to destination;

a second buffer memory which stores said cells transferred from said first buffer memory based on destinations of said cells, wherein said received cells are divided according to a destination of each of said received cells and said received cells are stored in divided form according to destination; and a controller which generates read address and timing signals for said first buffer memory and write address and timing signals for said second buffer memory based on a second buffer memory access time or a delay time depending on an access address of said second buffer memory and fixed-length cell storing status in said first buffer memory and information of destinations of said cells.

3. A communication apparatus which receives cells from a plurality of input lines, stores said received cells, and transfers said stored cells to an output line based on information of destinations of said cells, said communication apparatus comprising:

a first memory which stores said cells received from said input lines, wherein said received cells are divided according to a destination of each of said received cells and said received cells are stored in divided form according to destination;

a second memory which stores said received cells selected from said input lines for output to said output line, wherein said received cells are divided according to a destination of each of said received cells and said received cells are stored in divided form according to destination;

a controller which generates write address and timing signals for said first memory and read address and timing signals for said second memory based on a first memory access time or a delay time depending on an access address of said first memory and cell storing status in said second memory, and information a destinations of said cells.

4. A communication apparatus which receives cells from a plurality of input lines, stores said received cells, and transfers said stored cells to an output line based on information of destinations of said cells, communication apparatus comprising:

a first buffer memory which stores said cells selected from said input lines for output to said output line based on information of destinations of said cells received from said input lines, wherein said received cells are divided according to a destination of each of said received cells and said received cells are stored in divided form according to destination;

a second buffer memory which stores said cells, received from said first buffer memory based on information of destinations of said cells, wherein said received cells are divided according to a destination of each of said received cells and said received cells are stored in divided form according to destination; and a controller which generates read address and timing signals for said first buffer memory and write address and timing signals for said second buffer memory based on a second buffer memory access time or a delay time depending on an access address of said second buffer memory and cell storing status in said first buffer memory and information of destinations of said cells.

\* \* \* \* \*